UNITED STATES PATENT OFFICE.

CARL KLINGBIEL, OF DUISBURG, GERMANY.

PROCESS OF MAKING PHOSPHATES OF POTASH AND AMMONIA.

1,020,293.  Specification of Letters Patent.  Patented Mar. 12, 1912.

No Drawing.   Application filed January 20, 1911. Serial No. 603,737.

*To all whom it may concern:*

Be it known that I, CARL KLINGBIEL, a subject of the German Emperor, residing at Duisburg, in the Kingdom of Prussia, Germany, have invented a certain new and useful Process of Making Phosphates of Potash and Ammonia, of which the following is a specification.

Artificial manure-works have long tried to obtain a satisfactory compound of phosphoric acid and potash or ammonia.

The old and simple processes for producing from carbonate of potash and phosphoric acid the primary potassium-phosphate, or from ammonia and phosphoric acid the primary ammonium-phosphate, are too expensive for the potassium compound, and in the manufacture of the ammonium salt a considerable portion of the nitrogen becomes insoluble. On the other hand the processes by which potassium- or ammonium-sulfate is caused to act together with sulfuric acid on crude phosphate, is unsuitable, because a considerable portion of the potash and ammonia together with calcium-sulfate remains insoluble in the residue and is wasted.

The potassium sulfo-phosphate and the ammonium sulfo-phosphate formerly known in commerce was too acid and hygroscopic.

The process according to the German Patent No. 84954 avoids waste of potash, but the separation of sodium-sulfate from potassium phosphate is difficult, because the temperatures at which the products of the conversion are obtained separately, lie too near together. According to German Patent No. 66976 it was proposed, to cause potassium-chlorid and phosphoric acid to act upon each other with the aid of heat. The use of potassium chlorid was an improvement, because its price is essentially lower than that of potassium-sulfate, but although hydrochloric acid is obtained as a by-product, this latter process did not find favor as regards its commercial application; meta-phosphate is produced, whose re-conversion into primary potassium-phosphate was found too difficult, if attempted on a large scale.

The present process starts from primary sodium phosphate and potassium-chlorid or ammonium chlorid. It avoids the formation of meta-phosphate, by performing the process in aqueous solution according to the equation:

$$KCl + NaH_2PO_4 = NaCl + KH_2PO_4$$

or $$NH_4Cl + NaH_2PO_4 = NaCl + NH_4H_2PO_4$$

By this conversion the primary phosphates of potash or of ammonium are crystallized out in the cold, and the by-product sodium-chlorid at boiling temperature, in a manner quite analogous to the manufacture of potassium-nitrate from sodium nitrate and potassium chlorid.

For the manufacture of potassium-phosphate potassium-chlorid is introduced into the solution of the acid sodium-phosphate and the solution boiled down until a saturated solution of the sodium-chlorid thus formed, has been obtained. The solution is then allowed to cool, thereby causing a large portion of the potassium-phosphate to crystallize out. The phosphate is collected, the mother liquor is boiled down further, and the sodium chlorid is separated out mechanically, until the potassium-phosphate is in the form of a hot saturated solution. By allowing the liquid to cool a further quantity of potassium-phosphate is recovered and so on. The sodium chlorid may be easily separated from the potassium-phosphate by washing the latter with cold water. The sodium-chlorid may be easily freed from potassium-phosphate by hot washing. In both cases the washing is performed systematically, so as to gradually enrich the water used for washing.

The primary potassium phosphate is obtained as a micro-crystalline salt, which can be dried easily by moderate heat and is not hygroscopic.

In the manufacture of the primary ammonium phosphate the conditions are analogous, but the working on a commercial scale may be based on the following equations:

$$NaH_2PO_4 + NH_3 = NaNH_4HPO_4$$

and $$NaNH_4HPO_4 + HCl = NaCl + NH_4H_2PO_4$$

regard being had to the fact that ammonium-chlorid is usually more expensive than its components $NH_3$ and $HCl$. Moreover, it is advantageous to neutralize first with ammonia, for which purpose concentrated gas liquor may be used, to filter off the precipitate formed, and to add the hydrochloric acid to the filtrate. The sodium-phosphate liquor contains remnants of lime, and these remnants will easily form with ammonium salts double salts, which cause waste and render the boiling down more difficult. It is therefore preferable, to use the ammonia first as a purifying medium for the crude acid sodium-phosphate liquor, and then to produce ammonium-chlorid directly in the said liquor.

It is to be expected, that the primary potassium- and ammonium-phosphates containing a very high percentage of plant-food in a form entirely soluble in water, will acquire an important place among commercial manures.

What I claim is:—

1. The process for the manufacture of primary phosphates of potash or ammonia, which consists in decomposing primary sodium-phosphate by means of the chlorid of the corresponding base, substantially as described.

2. The process for the manufacture of potassium-phosphate, which consists in introducing potassium chlorid into a solution of acid sodium-phosphate, boiling down the solution so as to obtain a saturated solution of the sodium chlorid formed, then allowing the solution to cool, thereby causing a portion of the potassium phosphate to crystallize out, collecting the said phosphate, further boiling down the mother liquor, and separating the sodium chlorid from the remaining solution, substantially as described.

In testimony whereof I have hereunto set my hand in presence of two subscribing witnesses.

CARL KLINGBIEL. [L. S.]

Witnesses:
 PAUL VOGEL,
 DIETRICH HESSE.